(12) United States Patent
Van Den Kieboom et al.

(10) Patent No.: US 10,427,836 B2
(45) Date of Patent: Oct. 1, 2019

(54) COMBINATION SHIPPING AND DISPLAY PACKAGE

(71) Applicants: Jan M. Van Den Kieboom, Greendale, WI (US); JoAnne J. Van Den Kieboom, Greendale, WI (US)

(72) Inventors: Jan M. Van Den Kieboom, Greendale, WI (US); JoAnne J. Van Den Kieboom, Greendale, WI (US)

( * ) Notice: Subject to any disclaimer, the term of this patent is extended or adjusted under 35 U.S.C. 154(b) by 159 days.

(21) Appl. No.: 15/626,794

(22) Filed: Jun. 19, 2017

(65) Prior Publication Data

US 2018/0362213 A1   Dec. 20, 2018

(51) Int. Cl.
| | |
|---|---|
| *B65D 25/10* | (2006.01) |
| *B65D 77/00* | (2006.01) |
| *B65D 85/52* | (2006.01) |
| *B65D 41/02* | (2006.01) |
| *B65D 85/60* | (2006.01) |
| *A01G 5/00* | (2006.01) |
| *A01G 5/06* | (2006.01) |
| *B65D 43/02* | (2006.01) |
| *B65D 5/50* | (2006.01) |
| *A01G 9/029* | (2018.01) |
| *A01G 27/02* | (2006.01) |

(52) U.S. Cl.
CPC ............. *B65D 25/10* (2013.01); *A01G 5/00* (2013.01); *A01G 5/06* (2013.01); *B65D 5/5028* (2013.01); *B65D 41/02* (2013.01); *B65D 43/0218* (2013.01); *B65D 77/003* (2013.01); *B65D 85/52* (2013.01); *B65D 85/60* (2013.01); *A01G 9/029* (2018.02); *A01G 27/02* (2013.01)

(58) Field of Classification Search
CPC ........ B65D 85/20; B65D 85/52; B65D 25/10; B65D 25/108; B65D 5/5028; B65D 77/003; A01G 5/00; A01G 5/06
USPC .................................................. 206/423, 756
See application file for complete search history.

(56) References Cited

U.S. PATENT DOCUMENTS

| | | | |
|---|---|---|---|
| 1,875,497 A | * | 9/1932 | Richardson et al. ....................... B65D 5/5033 206/586 |
| 3,734,275 A | | 5/1973 | Greene |
| 4,586,649 A | | 5/1986 | Webinger |
| 4,662,107 A | | 5/1987 | Van Den Kieboom |
| 4,917,240 A | | 4/1990 | Roberts et al. |

(Continued)

*Primary Examiner* — Steven A. Reynolds
(74) *Attorney, Agent, or Firm* — Wozny Law, LLC; Thomas M. Wozny

(57) ABSTRACT

A combination shipping and display package for relatively small articles, especially gift items such as candy and other food, small green plants, young tree seedlings, or flowering plants. The package is designed to be lightweight, to protect the article being shipped, and to function as an adornment after delivery. The package includes a container for the article to be shipped, a stand for supporting the container, and a cap for covering the stand. The stand is collapsible into a flat shape and is expandable into an open upright shape for displaying the shipped article. The stand may also have printed matter thereon to provide a message or advertisement. When a plant is being shipped, the package may include a water-resistant breathable bag surrounding the container to help contain the seed or root ball of the plant during shipment, and to provide an additional ornamental feature for the plant when displayed.

8 Claims, 2 Drawing Sheets

(56) References Cited

U.S. PATENT DOCUMENTS

| | | | | |
|---|---|---|---|---|
| 4,958,461 | A | * | 9/1990 | Aldrich ................ A47G 7/02 47/41.01 |
| 5,137,207 | A | | 8/1992 | McAdam |
| 5,256,461 | A | | 10/1993 | Johnson |
| 5,381,625 | A | | 1/1995 | Wente |
| 5,381,892 | A | * | 1/1995 | Allen ................... B65D 5/48 206/216 |
| 5,572,826 | A | * | 11/1996 | Weder ................. A47G 7/063 383/11 |
| 5,715,629 | A | | 2/1998 | Hawkins |
| 5,878,945 | A | | 3/1999 | Weder |
| 6,098,336 | A | | 8/2000 | Ferguson |
| 6,129,208 | A | | 10/2000 | Ferguson |
| 6,167,653 | B1 | | 1/2001 | Van Den Kieboom |
| 6,272,792 | B1 | * | 8/2001 | Van den Kieboom ................. A01G 9/0299 47/84 |
| 2017/0055733 | A1 | * | 3/2017 | Gaffney ............... A47G 7/07 |

* cited by examiner

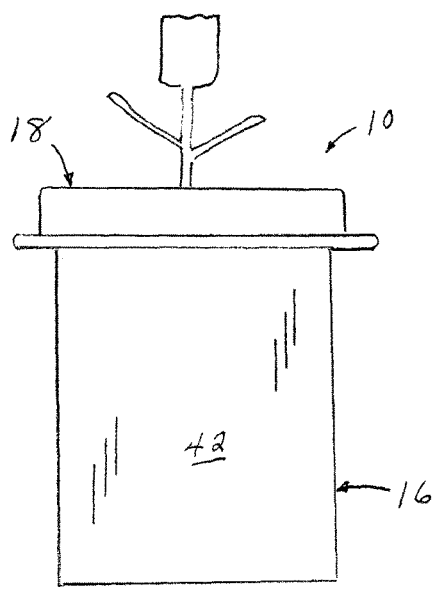
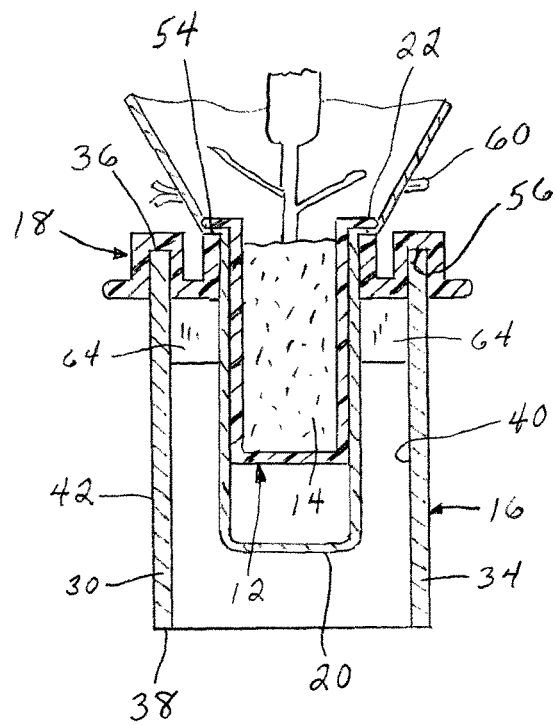
FIG. 1　　　　　FIG. 2
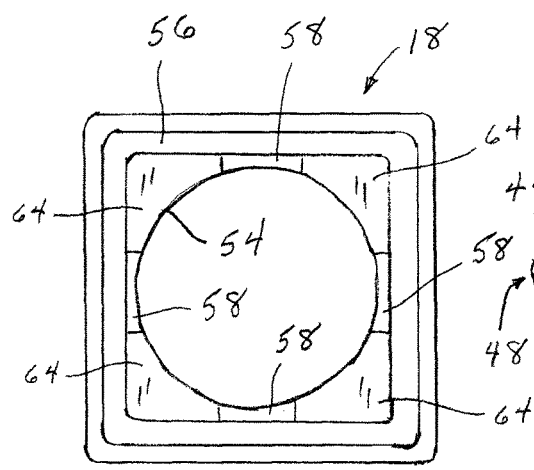
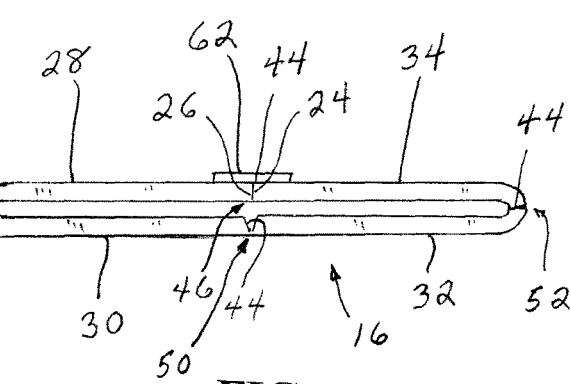
FIG. 3　　　　　FIG. 4

COMBINATION SHIPPING AND DISPLAY PACKAGE

FIELD OF THE INVENTION

The present invention is directed to a combination shipping and display package for various types of relatively small articles, especially gift items, such as, for example, candy and other non-perishable food, small green plants, young tree seedlings, or flowering plants. The package described herein will typically be used as an adornment on a table, dresser, counter, desk, shelf, or similar type surface.

BACKGROUND OF THE INVENTION

Gift items are often sent via a postal service or a commercial carrier to individuals for various reasons, such as birthdays, weddings, funerals, and anniversaries. It is thus necessary to place such items within a package that protects the items during shipment. In many cases, the item to be shipped is a plant including a stem having leaves, buds or flowers, and a root ball or seed ball. The root or seed ball is typically formed of an amount of soil bound about the roots of the plant by a breathable material, such as a piece of burlap. The root or seed ball enables the plant to survive the time period during which the plant is in transit, and then flourish in its new situation.

In order to protect the root or seed ball during shipment, the root or seed ball is typically positioned within a container suitable for enclosing and preventing damage to the root or seed ball. Usually, these containers take the form of rigid clay or plastic pots that not only protect the plant during shipment, but may also be used to display the plant after delivery. However, due to the size and weight of a clay or plastic pot, containers of this type significantly increase the overall weight and dimensions of the packaged plant to be shipped. Since the cost of shipping is typically based on the size and weight of the item being shipped, the use of a clay or plastic pot thus increases the cost of shipping a packaged plant to a point where it may become undesirably expensive.

Therefore, it is desirable to develop a shipping package that is lightweight, but able to protect the articles being shipped whether they are non-perishable food items, or plants, but especially designed to protect the root or seed ball and stem of a plant during shipment. It is also desirable that the shipping package may be used as an attractive display or adornment for the shipped article after delivery.

SUMMARY OF THE INVENTION

The present invention is a combination shipping and display package for various types of relatively small articles, especially gift items, such as, for example, candy and other non-perishable food, small green plants, young tree seedlings, or flowering plants. Typical plant articles may be, for example, a young spruce tree, a young eastern red cedar tree, a kalanchoe plant, or an amaryllis. The package described herein will typically be used as an adornment on a table, dresser, counter, desk, shelf, or similar type surface.

The package is comprised of:
(a) a container for holding an article to be shipped, said container having a hollow article-receiving interior, an open top and an outwardly projecting lip at said open top;
(b) a stand for supporting said container and article, said stand having a number of side walls, each side wall having a top edge, a bottom edge, an inner surface and an outer surface, and said side walls being interconnected in such a manner so as to be movable between a collapsed position wherein the walls fold into a substantially flat compact shape and an expanded position wherein the walls move into a substantially upright open shape; and
(c) a cap for covering said stand, said cap including a groove formed in its outer periphery engageable with and receiving therein the top edges of the side walls of the stand to maintain said stand in said expanded position, and a central opening defining a ridge engageable with the lip of said container to support said container within the interior of said stand.

Preferably, the stand is formed of a paper material having an imprintable outer surface so that at least one wall, but preferably each wall section of the support stand may also contain printed matter on the exterior surface of the wall section, enabling the stand to provide a message or advertisement. The printed matter may be imprinted directly onto the exterior surface of one or more wall sections, or may be imprinted on one side of sticky paper, such as an adhesive label, which is then adhered to the external surface of a wall section. Thus, the message or advertisement may be the same on each side of the stand, different for each side of the stand, or may be a complete wrap-around or panoramic message or advertisement. The message or advertisement may also be displayed electronically, if desired.

In another embodiment, a water-resistant, breathable bag may be used to surround the container and article to help contain the article during shipment. Preferably, the bag may comprise decorative paper material or be a colorful organza bag with a ribbon tie to provide an additional ornamental feature for the plant when displayed.

The present invention thus provides a shipping package for an article that not only protects the article during shipment, but also is lightweight in order to reduce the shipping costs.

The present invention also provides a package for the shipment of an article which may also be used as an attractive display or adornment for the article once delivered.

The present invention further provides a package which is very inexpensive to manufacture, enabling a further reduction in the costs of shipping.

BRIEF DESCRIPTION OF THE DRAWINGS

In the drawings:
(a)
FIG. 1 is a side elevation view of a package formed according to the present invention in which a seed ball is positioned;
(b)
FIG. 2 is a slightly enlarged longitudinal cross-sectional view of the package of FIG. 1;
(c)
FIG. 3 is a top plan view of the cap for the package;
(d)
FIG. 4 is a side elevation view of the collapsed and folded arrangement of the stand;
(e)

DETAILED DESCRIPTION OF THE INVENTION

Figure 5:
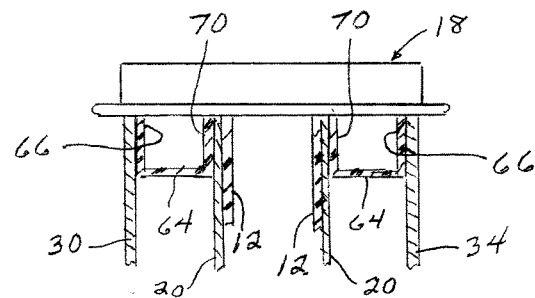
FIG. 5 is a partial cross-sectional view illustrating the cap having depending pockets for supporting both the side walls of the stand in their expanded open position as well as the plant container within the interior of the stand; and
(f)

With reference now to the drawings, in which like reference numerals designate like parts throughout the disclosure, a combination shipping and display package 10 for an article is illustrated in FIG. 1. The article to be shipped may comprise various types of relatively small articles, especially gift items, such as, for example, candy and other non-perishable food, small green plants, young tree seedlings, or flowering plants. The package 10 is particularly designed for shipping plants, and thus the following description is directed to that specific use, but is not limited to such use because, as noted above, other small articles could be substituted for the word "plant" used in the following description. The package 10 described herein will typically be used as an adornment on a table, dresser, counter, desk, shelf, or similar type surface.

Package 10 includes a container 12 for enclosing a seed or root ball 14 of a plant, a stand 16 for supporting the container 12 and seed or root ball 14, and a cap 18 for covering the stand 16. In some embodiments, a water-resistant breathable bag 20 may also surround the container 12 and seed or root ball 14 to help contain the plant during shipment and to provide an additional ornamental feature for the plant when displayed as an adornment.

The container 12 comprises an open-top, closed-bottom, cup-shaped member having a hollow article-receiving interior, as is apparent from FIG. 2 and known to one skilled in this art. Container 12 is dimensioned to accept and hold seed or root ball 14 therein, and has a volume sized to substantially correspond with the seed or root ball 14. Container 12 is preferably formed of a thin resilient thermoplastic material such as polyurethane or polystyrene to provide a waterproof and substantially rigid member in order to minimize weight, which in turn minimizes shipping costs. Container 12 has an outwardly projecting lip 22 formed along the periphery of its open-top, as best seen in FIG. 2. Lip 22 may be a single continuous member formed along the entire periphery of container 12, or may be multiple members circumferentially spaced about the periphery of container 12. In cross section, the open-top and closed bottom of container 12 are preferably circular in shape resulting in the lip 22 being preferably annular in shape, while the body of container 12 is preferably cylindrical in shape. However, their cross sections could be any desired geometric shape, including square, rectangular, oval, hexagonal and other shapes.

The stand 16 is formed of a single, elongate, rectangular strip of material having opposite ends 24 and 26. Stand 16 is preferably composed of paper stock, such as cardboard, and has four rectangular side walls 28, 30, 32 and 34, disposed between opposite ends 24 and 26. Each side wall 28, 30, 32 and 34 has a top edge 36, an opposite bottom edge 38, a flat inner surface 40, and a flat outer surface 42. Outer surface 42 is preferably formed by an imprintable paper substrate so as to have printed matter thereon to provide a message, such as "Happy Birthday" or "Happy Anniversary", or an advertisement. The printed matter may be imprinted directly onto the outer surface 42 of one or more side walls 28, 30, 32, or 34, or may be imprinted on one side of sticky paper, such as an adhesive label, which is then adhered to the outer surface 42 of a side wall. Thus, the message or advertisement may be the same on each side of the stand, different for each side of the stand, or may be a complete wrap-around or panoramic message or advertisement. The message or advertisement may also be displayed electronically, if desired.

As shown best in FIG. 4, a fold line 44 is located between adjacent side walls. The fold lines 44 enable each side wall 28, 30, 32 and 34 to flex and fold with respect to adjacent side walls and form the rectangular upright configuration of stand 16. Thus, the side walls 28, 30, 32 and 34 are movable between a collapsed position, shown in FIG. 4, wherein the side walls 28, 30, 32 and 34 fold into a substantially flat compact shape, and an expanded position, shown in FIGS. 1 and 2, wherein the side walls 28, 30, 32 and 34 move into a substantially upright and open shape for receiving container 12 therein, and for displaying the plant. In its expanded position, the bottom edges 38 of side walls 28, 30, 32 and 34 support stand 16 in its upright position by engaging the surface of a table, dresser, counter, desk, or shelf (not shown), as would be well known to one skilled in this art.

In order to form stand 16, so that side walls 28, 30, 32 and 34 can be moved between their collapsed compact shaped position and their upright expanded position, the single, elongate, rectangular strip of material is initially folded about fold lines 44 to form the square or rectangular configuration shown in FIGS. 1 and 2 having four 90° corners 46, 48, 50 and 52. The end 24 of side wall 28 is then attached to the opposite end 26 of side wall 34, preferably by adhesive tape 62 extending along the inner surface 40, or the outer surface 42, or both, of side walls 28 and 34. This construction results in side walls 28, 30, 32, and 34 being interconnected at fold lines 44 to form the expanded position shown in FIGS. 1-3 for stand 16 yet also enabling side walls 28, 30, 32 and 34 to be folded into their collapsed and substantially flat compact shape shown in FIG. 4. As illustrated in FIG. 2, stand 16 has an open bottom when in its expanded position. However, as is apparent to one skilled in this art, the bottom of stand 16 may also be closed by using interconnecting flaps (not shown) attached to the bottom edges 38 of side walls 28, 30, 32, and 34.

The cap 18 not only covers the upper opening formed by the stand 16 when in its expanded open shape, but cap 18 also functions to retain stand 16 in its expanded open shape as well as supports and holds the container 12 and seed or root ball 14 within the interior of stand 16. Cap 18 is preferably composed of a thin resilient thermoplastic material such as polyurethane or polystyrene in order to minimize weight. Cap 18 is a relatively planar-shaped member having a central opening formed therein through which the plant extends. The central opening defines an inwardly projecting ridge 54 engageable with the lip 22 of the container 12 to hold, support and suspend container 12 and seed or root ball 14 within the interior of stand 16, as best shown in FIG. 2. To retain stand 16 in its expanded open position, cap 18 has an upwardly extending groove 56 formed in its underside along its outer periphery which is engageable with and frictionally receives the top edges 36 of side walls 28, 30, 32 and 34 in a relatively tight or snug manner. Thus, the width or thickness of the top edges 36 of side walls 28, 30, 32 and 34 is substantially the same as the width or thickness of each corresponding section of groove 56, and the overall shape and dimensional length of groove 56 matches the shape and dimensional length of stand 16, e.g. a 5 inch by 5 inch wide square stand 16 would require a 5 inch by 5 inch square groove 56.

Figure 6:
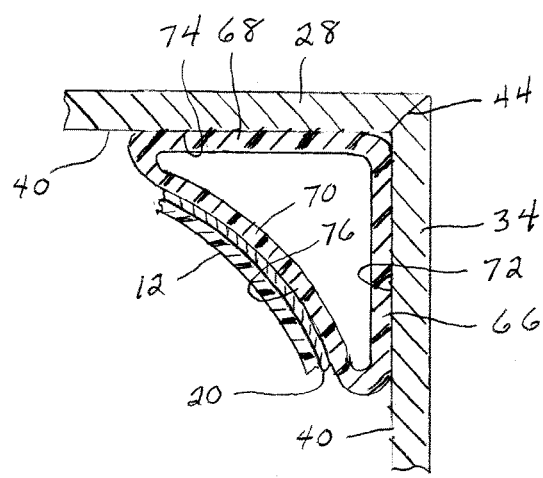
FIG. 6 is an enlarged cross-sectional view of the pockets formed in the cap which support the side walls and plant container.

A plurality of struts 58 circumferentially spaced about the central opening in cap 18 and extending radially outwardly therefrom between groove 56 and ridge 54 provide dimensional support for ridge 54 and groove 56 as well as rigidity to the cap 18. As shown in FIG. 3, there are preferably four struts 58 so that one strut 58 is associated with each of the four sides of cap 18 in order to provide the desired rigidity for cap 18. As also shown in FIG. 3, there are also four pockets 64 formed in the top surface of cap 18. One pocket 64 is located at each of the four corners of cap 18. Pockets 64 are formed generally as triangular-shaped recesses in cap 18, as shown best by FIG. 6. Since each pocket 64 is identical, only one need hereinafter be described. Accordingly, referring to FIGS. 5 and 6, pocket 64 includes a pair of substantially flat outer sides 66 and 68 depending from the underside of cap 18 and disposed at 90 degrees to each other, and an arcuate-shaped inner side 70 depending from the underside of cap 18 and disposed oppositely of the outer sides 66 and 68. Outer sides 66 and 68 define planar-shaped outer surfaces 72 and 74, respectively, each of which depends from the underside of cap 18. When cap 18 is assembled onto the open top of stand 16, the planar outer surfaces 72 and 74 abut against the flat inner surface 40 of the side walls 28 and 34, respectively, of stand 16 to provide support as well as rigidity and strength to stand 16 so as to avoid the possibility of stand 16 collapsing during handling. Also, when cap 18 is assembled onto the open top of stand 16, the arcuate-shaped surface 76 of inner side 70 of pocket 64 abuts against bag 20 and the body of container 12 so as to help stabilize container 12 within stand 16 and to avoid excessive movement of container 12 and seed or root ball 14 within stand 16 during handling.

A water-resistant breathable enclosure or bag 20 is optionally, but preferably, used to surround the container 12 and seed or root ball 14 to protect and contain the container 12 and seed or root ball 14 during shipment. The bag 20 is secured about the container 12 and seed or root ball 14 by a fastener 60. Fastener 60 may be a drawstring integrally formed about the top of bag 20, or may be a separate member such as a twistable tie. In some embodiments, bag 20 may be composed of a decorative paper laminate. In another embodiment, the bag 20 may be a colorful (e.g. red or white) organza bag. A top portion of the decorative paper laminate or the organza bag will typically project through the central opening above cap 18, and the decorative paper laminate or organza bag will thus provide an additional ornamental feature for the plant when displayed as an adornment, as best shown in FIG. 2.

To form the package 10 of the present invention, first a roll of resilient, printable material such as paper stock used to form the stand 16 continuously passes through a printing machine which prints the desired markings on the outer surface 42 of the material. The material is then cut in a conventional manner into strips of a specified length. After being cut, the strips are then folded or crimped utilizing a suitable machine, or by hand, to form the fold lines 44 and side walls 28, 30, 32, and 34 from the strip. After the fold lines 44 are formed in the strip, the strip may be folded to form the expanded stand 16, or may be folded into the collapsed arrangement shown in FIG. 4 for shipment to a location where they will be used to form the package 10 for shipment of plants including their seed or root balls 14. Typically, a plurality of the containers 12 will be nested together, and a plurality of the caps 18 will be nested together, and a plurality of collapsed stands 16 will all be shipped in a master box. The containers 12, stands 16 and caps 18 can then be assembled as shown in FIGS. 1 and 2 at the delivered location to display the plant as an adornment.

We claim:

1. A combination shipping and display package, comprising:
    (a) a container for holding an article to be shipped, said container having a hollow article receiving interior, an open top, and an outwardly projecting lip at said open top;
    (b) a stand for supporting said container and article, said stand having four sidewalls that form a rectangular structure, each side wall having a top edge, a bottom edge, an inner surface and an outer surface, and said side walls being interconnected in such a manner so as to be movable between a collapsed position wherein the walls fold into a substantially flat compact shape and an expanded position wherein the walls move into a substantially upright open shape; and
    (c) a cap for covering said stand, said cap including an upper surface and a lower surface, and a groove formed in its outer periphery engageable with and receiving therein the top edges of the side walls of the stand to maintain said stand in said expanded position, and a central opening defining an inwardly projecting ridge engageable with the lip of said container to support said container within the interior of said stand, said cap further including at least one pocket formed therein defining a recess in the upper surface thereof, said pocket further defining a pair of outer sides depending from said lower surface thereof and disposed at 90 degrees to each other, each of said outer sides defines a planar surface that abuts against the inner surface of an adjacent side wall of said stand, and an arcuate-shaped inner side depending from said lower surface thereof and disposed oppositely of said outer sides to define an arcuate-shaped surface that abuts against the container within said stand.

2. The package of claim 1 wherein at least one side wall of the stand includes a flat outer surface.

3. The package of claim 1 wherein the article to be shipped comprises a green plant, a tree seeding, a flowering plant, or a non-perishable food item.

4. The package of claim 3 wherein a water-resistant bag surrounds the container and the article to be shipped.

5. The package of claim 4 wherein the water-resistant bag is formed of decorative paper.

6. The package of claim 1 wherein the container is cylindrically-shaped, and the open top, the outwardly projecting lip, and the inwardly projecting ridge of said cap are all circular in shape.

7. The package of claim 6 wherein the lip includes a lower surface and the ridge includes an upper surface engageable with said lower surface to support said container in said stand.

8. The package of claim 1 wherein said cap includes a pocket formed therein in each corner thereof.

* * * * *